US012799760B2

(12) United States Patent
Deigert

(10) Patent No.: US 12,799,760 B2
(45) Date of Patent: Nov. 17, 2026

(54) SYSTEMS, METHODS AND APPARATUS FOR ROLLING PENDULUM BASE ISOLATION

(71) Applicant: Cal Poly Corporation, San Luis Obispo, CA (US)

(72) Inventor: Michael J Deigert, San Luis Obispo, CA (US)

(73) Assignee: Cal Poly Corporation, San Luis Obispo, CA (US)

( * ) Notice: Subject to any disclaimer, the term of this patent is extended or adjusted under 35 U.S.C. 154(b) by 113 days.

(21) Appl. No.: 18/620,322

(22) Filed: Mar. 28, 2024

(65) Prior Publication Data

US 2024/0240486 A1 Jul. 18, 2024

Related U.S. Application Data

(63) Continuation-in-part of application No. 18/144,842, filed on May 8, 2023.

(60) Provisional application No. 63/348,083, filed on Jun. 2, 2022.

(51) Int. Cl.

*E04H 9/02* (2006.01)
*E04B 1/36* (2006.01)
*F16F 15/02* (2006.01)

(52) U.S. Cl.

CPC ............... *E04H 9/023* (2013.01); *E04B 1/36* (2013.01); *F16F 15/021* (2013.01)

(58) Field of Classification Search

CPC ..... E04H 9/023; E04H 9/0237; E04H 9/0235; E04H 9/022; E04H 9/0215; E04H 9/021; E04B 1/36; F16F 15/021

USPC .............................................. 52/167.1–167.6

See application file for complete search history.

(56) References Cited

U.S. PATENT DOCUMENTS

| | | | | | | |
|---|---|---|---|---|---|---|
| 1,761,660 | A | * | 6/1930 | Cummings | E04H 9/023 | 52/167.5 |
| 2,002,934 | A | * | 5/1935 | Collins | E04H 9/023 | 14/15 |
| 4,124,963 | A | * | 11/1978 | Higuchi | E04B 1/0007 | 52/741.15 |
| 4,514,941 | A | * | 5/1985 | Gonzalez Flores | E02D 27/34 | 14/73.5 |
| 4,726,161 | A | * | 2/1988 | Yaghoubian | E04H 9/023 | 52/167.6 |
| 4,881,350 | A | * | 11/1989 | Wu | E04H 9/023 | 248/580 |

(Continued)

*Primary Examiner* — Brian E Glessner
*Assistant Examiner* — Adam G Barlow
(74) *Attorney, Agent, or Firm* — Meunier Carlin & Curfman LLC

(57) ABSTRACT

A system and method of a rolling pendulum base system includes a base including a spherically shaped, concave upper base surface, multiple bearings supported within the spherically shaped, concave upper base surface, a slider including a slider body, a spherically shaped, convex upper slider surface on an upper end of the slider body and a convex lower slider surface on the lower end of the slider body, the convex lower slider surface disposed on the bearings, and a pedestal including a pedestal body, a spherically shaped, concave lower pedestal surface on a lower end of the pedestal body and a flat upper pedestal surface on an upper end of the pedestal body, the concave lower pedestal surface disposed on the convex upper slider surface.

15 Claims, 14 Drawing Sheets

(56) References Cited

U.S. PATENT DOCUMENTS

| | | | | | |
|---|---|---|---|---|---|
| 4,974,378 | A * | 12/1990 | Shustov | E02D 27/34 | 52/167.3 |
| 5,261,200 | A * | 11/1993 | Sasaki | E04B 1/36 | 248/638 |
| 6,021,992 | A * | 2/2000 | Yen | F16F 7/08 | 248/560 |
| 6,116,784 | A * | 9/2000 | Brotz | F16C 23/00 | 384/582 |
| 6,688,051 | B2 * | 2/2004 | Tsai | E04H 9/023 | 52/167.7 |
| 7,018,102 | B1 * | 3/2006 | Brotz | F16C 23/00 | 384/582 |
| 8,484,911 | B2 * | 7/2013 | Zayas | E04H 9/021 | 248/562 |
| 8,833,745 | B2 * | 9/2014 | Fujita | E04H 9/0235 | 267/140.11 |
| 9,175,490 | B2 * | 11/2015 | Sato | E04H 9/021 | |
| 11,193,294 | B2 * | 12/2021 | Lu | E04H 9/023 | |
| 2003/0167707 | A1 * | 9/2003 | Tsai | E04H 9/023 | 52/167.6 |
| 2005/0150179 | A1 * | 7/2005 | Shustov | E04H 9/023 | 52/167.1 |
| 2006/0174555 | A1 * | 8/2006 | Zayas | E04H 9/021 | 52/167.4 |
| 2006/0272225 | A1 * | 12/2006 | Tsai | E04H 9/023 | 52/167.1 |
| 2007/0044395 | A1 * | 3/2007 | Lu | E04H 9/023 | 52/167.4 |
| 2008/0120927 | A1 * | 5/2008 | Tsai | E04H 9/023 | 52/167.4 |
| 2014/0338271 | A1 * | 11/2014 | Yakoub | E04H 9/023 | 52/741.3 |
| 2018/0195267 | A1 * | 7/2018 | Massa | E04B 1/36 | |
| 2019/0368138 | A1 * | 12/2019 | Weber | E01D 19/046 | |
| 2023/0193623 | A1 * | 6/2023 | Pan | F16F 7/108 | 248/569 |
| 2024/0240688 | A1 * | 7/2024 | Geng | H05K 7/20281 | |

* cited by examiner

SYSTEMS, METHODS AND APPARATUS FOR ROLLING PENDULUM BASE ISOLATION

CROSS REFERENCE TO RELATED APPLICATIONS

This application is a continuation of U.S. patent application Ser. No. 18/144,842, filed on May 8, 2023 and entitled "Systems, Methods and Apparatus for Resilient Gert Haunch Moment Frame Connection," which is incorporated herein by reference in its entirety and for all purposes and which claims priority from U.S. Provisional Patent Application No. 63/348,083 filed on Jun. 2, 2022 and entitled "Systems, Methods and Apparatus for Resilient Gert Haunch Moment Frame Connection and Rolling Pendulum Base Isolation," which is incorporated herein by reference in its entirety and for all purposes.

FIELD OF THE DISCLOSURE

The present disclosure relates generally to systems and methods for improving structures resiliency to lateral forces including seismic and wind forces.

BACKGROUND

Earthquake and wind prone locales typically require some type of system to reduce damage to structures incurred during lateral force incidents such as an earthquake or wind or other lateral force events that may cause the structure to partially or fully collapse or otherwise become unstable and/or unrepairable.

The typical approach to reducing structural collapse due damage caused by an earthquake and other lateral forces is to increase the overall strength of the structural lateral force resisting members. The overall strength of the structural members is typically increased by using more members or increasing the size of the structural lateral force resisting members which makes the structural members stiffer and less able to deflect during lateral force events. As a result, the stiffer structures are able to resist failure to a particular intensity of lateral forces and/or a particular amount of deflection of the structure caused by the lateral forces imparted to the structure. Once either of the force or deflection limits are exceeded, the structure suffers near complete structural failure, often resulting in a catastrophic collapse. Further, the structural members that do not fail but are only damaged by the lateral force events are not repairable. As a result of the structural member damage, the only practical option available after lateral force caused damage, is complete demolition of the entire structure.

One typical approach to improve the structural resiliency to lateral force events uses base isolation systems installed between the foundation of the structure and the structure itself. The typical base isolation systems include elastomeric, sliding and other types of isolation bearings installed between the foundation of the structure and the structure itself. The most common used isolators are low damping laminated rubber bearings, high damping laminated rubber bearings, flat sliding bearings and friction pendulum systems. Different types of isolators are sometimes combined to provide additional isolation performance.

Traditionally, seismic designs for structures of buildings have been highly focused on increasing the strength and ductility of structures to better respond to the forces associated with earthquake ground motions and other lateral force events (e.g., hurricanes and other high wind events and any other event that can impose lateral forces to the structure). Building codes are continually updated to better reflect the current understanding of the forces associated with lateral force events on various structure types.

Another typical approach to lateral force and seismic resistant designs is to significantly reduce the forces on structures as a result of lateral force events through implementing one of several base isolation systems. However, despite the numerous benefits that base isolation systems offer, the use of these systems is not common in building construction, even in areas of high seismic, wind and other lateral force activity. Typical reasons for this scarcity include the base isolation systems' complicated design and increased costs incurred from manufacturing and construction. It is in this context that the following embodiments arise.

SUMMARY

Broadly speaking, the present disclosure fills these needs by providing systems, methods and apparatus for isolating structures from lateral force events. It should be appreciated that the present disclosure can be implemented in numerous ways, including as a process, an apparatus, a system, or a device. Several inventive embodiments of the present disclosure are described below.

One implementation includes a rolling pendulum base system including a base including a spherically shaped, concave upper base surface, multiple bearings supported within the spherically shaped, concave upper base surface, a slider including a slider body, a spherically shaped, convex upper slider surface on an upper end of the slider body and a convex lower slider surface on the lower end of the slider body, the convex lower slider surface disposed on the bearings, and a pedestal including a pedestal body, a spherically shaped, concave lower pedestal surface on a lower end of the pedestal body and a flat upper pedestal surface on an upper end of the pedestal body, the concave lower pedestal surface disposed on the convex upper slider surface.

The slider body can be formed from a first quantity of cast material and the convex upper slider surface can be formed from a first curved metal sheet and the convex lower slider surface can be formed from a second curved metal sheet and the first curved metal sheet and the second curved metal sheet are bonded to the first quantity of cast material.

The pedestal body can be formed from a second quantity of cast material and the concave lower pedestal surface can be formed from a third curved metal sheet bonded to the second quantity of cast material.

The concave upper base surface can be formed from a fourth curved metal sheet. The concave upper base surface and the convex lower slider surface have a first radius R1 and the convex upper slider surface and the concave lower pedestal surface have a second radius R2. The first radius R1 can be equal to the second radius R2. Alternatively, first radius R1 can be unequal to the second radius R2.

The base can include a perimeter curb disposed on a perimeter of the upper base surface. The concave upper base surface can have a circular shape having a first diameter. The convex lower slider surface can have a circular shape having a second diameter, wherein the first diameter is greater than the second diameter. The concave lower pedestal surface can have a circular shape having a third diameter and the convex upper slider surface has a circular shape having a fourth diameter. The third diameter can be equal to or greater than the fourth diameter. Alternatively, the fourth diameter can be equal to or greater than the third diameter.

Another implementation includes rolling pendulum base system including a base including a spherically shaped, concave upper base surface, the concave upper base surface including a first hydroformed metal sheet bonded to a base body, bearings supported within the spherically shaped, concave upper base surface, a slider including a slider body, a spherically shaped, convex upper slider surface on an upper end of the slider body and a convex lower slider surface on the lower end of the slider body, the convex lower slider surface disposed on the bearings, the convex upper slider surface including a second hydroformed metal sheet bonded to the upper end of the slider body and the convex lower slider surface including a third hydroformed metal sheet bonded to the lower end of the slider body, a pedestal including a pedestal body, a spherically shaped, concave lower pedestal surface on a lower end of the pedestal body and a flat upper pedestal surface on an upper end of the pedestal body, the concave lower pedestal surface disposed on the convex upper slider surface, wherein the concave lower pedestal surface includes a fourth hydroformed metal sheet bonded to the lower end of the pedestal.

Yet another implementation includes a method of isolating a structure from a lateral force event including supporting the structure on a rolling pendulum base isolation system, allowing the structure to roll on the rolling pendulum base isolation system in a first lateral direction relative to the rolling pendulum base isolation system, in response to a lateral force imparted to the structure, centering the structure on the rolling pendulum base isolation system after the lateral force.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

DETAILED DESCRIPTION

Figure 1:
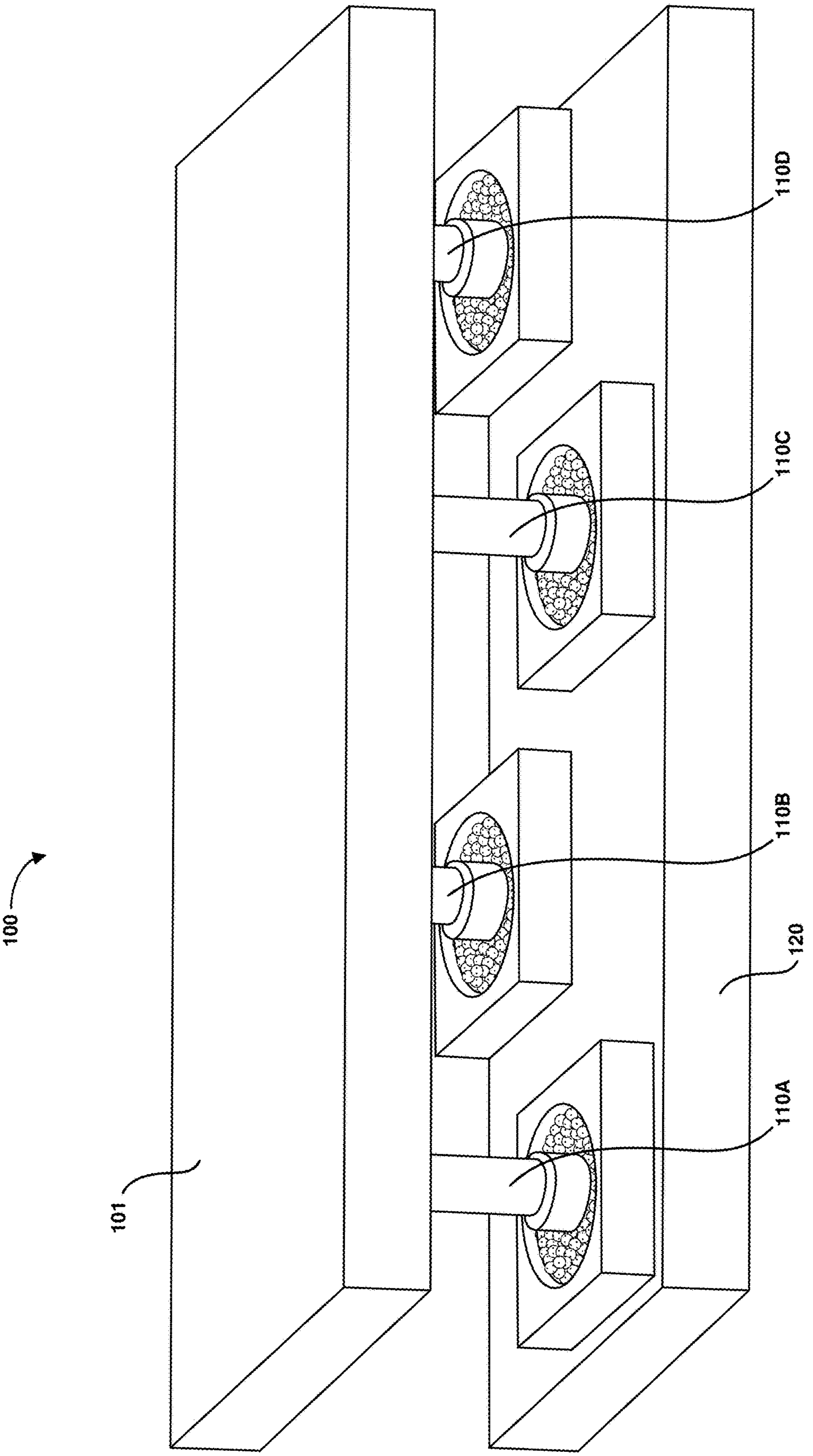
FIG. 1 illustrates a rolling pendulum base isolation system, for implementing embodiments of the present disclosure.

Several exemplary embodiments of systems, methods and apparatus for isolating structures from lateral force events, such as an earthquake or wind, and improving resiliency of structures will now be described. It will be apparent to those skilled in the art that the present disclosure may be practiced without some or all of the specific details set forth herein. It should be appreciated that the present disclosure can be implemented in numerous ways. Several inventive embodiments of the present disclosure are described below. Other aspects and advantages of the disclosure will become apparent from the following detailed description, taken in conjunction with the accompanying drawings, illustrating by way of example the principles of the disclosure.

The embodiments presented herein include multiple implementations of design and testing of a new rolling base isolation system that utilizes hydroforming technology to produce a substantially spherically shaped bearing plate that allows the structure to self-center, after occurrence of a lateral force event. The spherically shaped bearing plate can be manufactured using less costly material and manufacturing methods than suggested by existing base isolation systems.

In at least one implementation, a thin spherically shaped bearing plate is integrated with a concrete base to provide a large bearing capacity while maintaining low friction between the structure and the ground. The spherically shaped bearing plate is targeted at low-rise (e.g., less than 4 story structures) and mid-rise structures (e.g., between about than 4 story and about 12 story structures) with the aim of providing an affordable and less technically complex alternative to existing base isolation systems. The resiliency of the spherically shaped bearing plate base isolation systems could prove to extend the life of structures and minimize the repair efforts associated with damage as a result of major earthquakes and other lateral force events.

As structural engineers aim to protect life, safety, and most recently, provide increased resiliency for modern structures, base isolation systems are gradually becoming more prevalent along with the widening scope of education and research on the topic. The first documented proposal for a base isolation system is U.S. Pat. No. 99,973, issued Feb. 15, 1870, to Jules Touaillon for a double concave rolling ball bearing. However, over a century of technological advances were required to make Touaillon's concept a feasible reality, and even then, Touaillon's double concave rolling ball bearing system remain relatively limited in application due to high manufacturing and construction costs. Most implementations of Touaillon's double concave rolling ball bearing system are designed for culturally and socially important, large, expensive structures including historic structures, government structures, hospitals or other projects for affluent, corporate clients.

There are several base isolation systems on the market, elastomeric and sliding systems have become the most common. Earthquake Protection Systems (EPS) pioneered the Friction Pendulum™ base isolation system in 1985 and has continued to improve the system with multiple sliding surfaces.

Effective base isolation systems have two key benefits for the response of a structure during seismic and lateral force events. First, the base isolation system greatly reduces the lateral forces exerted on a structure by lengthening the period of the structure and adding damping to the response to the lateral force. The longer period and increased damping results in lower accelerations for the structure when compared to an identical fixed base structure. These effects are most pronounced for stiffer and shorter structures where the natural period is lower, and by association, the spectral accelerations are higher.

Second, base isolation systems concentrate the lateral displacement of the structure at the isolation plane. This minimizes damage incurred in the structure since the relative displacements between each of the floors of the structure are much smaller with an isolated base compared to a fixed base. Essentially, a base isolated structure can exhibit motion similar to a rigid body during a lateral force event. This is in sharp contrast with a flexible structure that would sustain much more permanent deformation, including both structural and non-structural damage.

In both retrofit work and new construction, most structural designers choose to pursue more cost-efficient strategies for mitigating lateral force event effects unless the cost of a base isolation system is anticipated, or preservation requirements necessitate a foundation level solution to avoid impacting the primary spaces. In general, base isolation systems are rarely considered for building projects with standard importance levels due to cost.

There is a need for base isolation systems to be included in more typical, lower cost construction projects, inherently requiring a reduction in the manufacturing cost of these systems. Cost-accessible base isolation systems can expand the technology beyond current applications, bringing the base isolation system market into residential and commercial building sectors.

Typical base isolation systems require a significant amount of applied lateral force before the mechanism begins to move and any energy dissipation can occur. This is due to significant inertia and friction, which must be overcome and resolved as the base isolation system begins to function as designed. A base isolation system that activates with less initial lateral force can allow base isolation systems to be used in wider applications than the current market. Light-framed wood structures, for example, are significantly lighter than many of the large concrete and steel structures sitting on typical base isolation systems.

Embodiments described herein promote earlier activation while still providing sufficient friction to dissipate lateral force event energy and protect the structure above. One implementation includes a rolling isolator with multiple bearings. Single-bearing isolators require a costly machining process for stability. A simpler, rolling isolator system with multiple rolling bearings can create a rolling surface that adequately supports the structure above the rolling isolator system. Using multiple rolling bearings that exhibit the desired properties, significant lateral force isolation can be achieved, at lower manufacturing costs and therefore allowing for use for a wider variety of building types.

One implementation described herein includes a rolling pendulum base isolation system. The rolling pendulum base isolation system can be constructed with common construction labor skills, materials, without requiring high-cost manufacturing facilities and processes necessary to create typical pendulum-type base isolators in the industry today. Furthermore, the described construction process is easily repeatable to ensure the validity of the rolling pendulum base isolation system for potential, future, ease of production.

The rolling pendulum base isolation system includes multiple isolators. Each isolator created by the process exhibits substantially identical dimensions and properties to a level of precision necessary for use in common construction. In at least one implementation, each isolator includes a pedestal and a slider. A pedestal bearing surface and an opposite slider bearing surface and a base bearing surface between the slider and the base have sufficiently similar shape to provide between about 80 percent and about 100 percent bearing contact area, more ideally the bearing surfaces have sufficiently similar shape to provide to about 90 percent contact area.

The rolling pendulum base isolation system provides structural stability while simultaneously providing an isolation medium with relatively low resistance to movement as rolling friction is less than sliding friction. The rolling pendulum base isolation system demonstrated suitable functionality after long periods of time of no movement to be applicable for full-scale structure implementation. In terms of materiality, these long periods of no movement requirement necessitate all bearings and bearing surfaces to be resistant to deterioration over significant periods of time and especially during a lateral force event. In contrast, the sliding friction system surfaces can substantially bond together and the resistance to sliding will increase, over long periods of no movement, more than a rolling friction system. Finally, the rolling pendulum base isolation system appears to perform as well or better than existing base isolation systems in terms of energy dissipation and re-centering of the mechanism after a lateral force event such as an earthquake or wind event. The resulting data illustrates a successful implementation of a rolling pendulum base isolation system.

FIG. 1 illustrates a rolling pendulum base isolation system 100, for implementing embodiments of the present disclosure. The rolling pendulum base isolation system 100 supports a supported structure 101 and includes multiple isolators 110A-D. The multiple isolators are mounted on a foundation 120. For testing purposes, the foundation 120 can be mounted on a shaker table (not shown) for testing the multiple isolators ability to isolate the movement of the structure 101, e.g. a concrete slab, from lateral movement of the shaker table.

Figure 2:
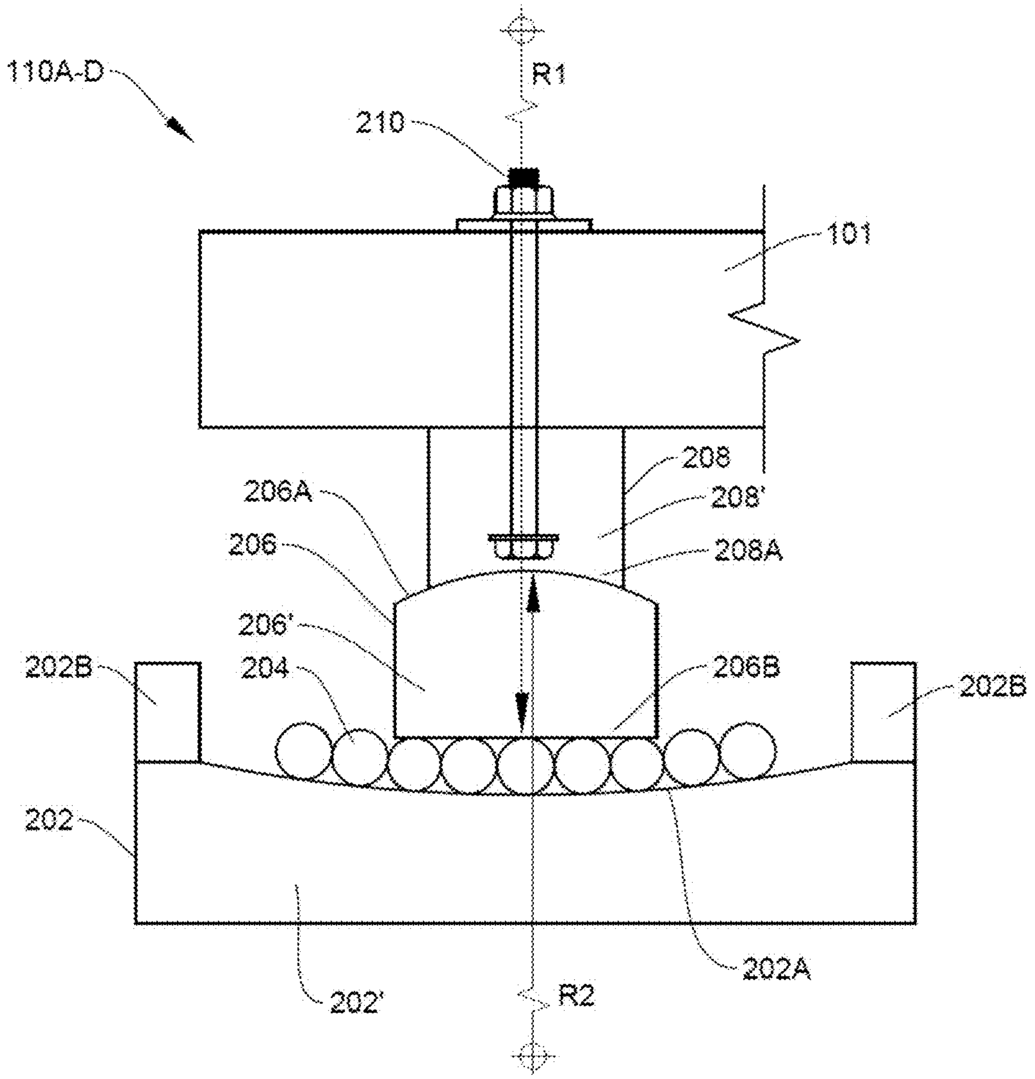
FIG. 2 illustrates a schematic side view of one of the multiple isolators, for implementing embodiments of the present disclosure.

FIG. 2 illustrates a schematic side view of one of the multiple isolators 110A-D, for implementing embodiments of the present disclosure. Each isolator includes four main components. A base 202 includes a substantially spherical, concave upper base surface 202A formed on a base body 202'. Multiple rolling bearings 204 are contained within the concave upper surface. The multiple bearings 204 can include between about 20 and about 120 bearings.

A slider 206 rests on top of the multiple bearings. The slider includes a slider body 206' with an upper slider end and a lower slider end. The lower slider end has a substantially spherical, convex lower surface 206B. The convex lower surface 206B and the concave upper base surface 202A have substantially equal radii R1. The slider 206 also includes a substantially spherical, convex upper surface 206A on the upper end of the slider body. A pedestal 208 rests on the top of the slider top surface 206A. It should be understood that the specific shapes and sizes of the slider 206 and the pedestal 208 may be revised to satisfy actual building structures. The pedestal 208 is secured to the structure 101 with one or more bolts or pins or other suitable fasteners 210 passing through a slider body 208'. The pedestal has a flat upper surface on an upper pedestal body end. The pedestal has a substantially spherical, concave lower surface 208A on a lower pedestal body end. The concave lower surface 208A of the pedestal and the convex upper surface 206A of the slider have a substantially equal radii R2. Radii R1 and R2 may or may not be substantially equal in various embodiments. In at least one implementation, the radius R1 is related to the period of the isolated building structure. By way of example, the greater the radius R1, the longer period of the isolated building structure. The longer period typically provides improved isolation. In at least one implementation, radius R2 was sized to provide more stability, as a smaller radius R2 resulted in more of a ball and socket shape which helps prevent the pedestal 208 from sliding off the slider 206. The smaller radius R2 helps keep the pedestal 208 and the slider 206 connected during horizontal movement, while also allowing the rotation between the pedestal and slider as to keep the isolated building structure substantially level. In at least one implementation, the slider 206 and pedestal 208 diameter are sized to maximize the amount of bearing area.

The slider 206 provides the ability for lateral shifting and rotation between the structure 101 above and the base 202, to allow the rolling pendulum isolator 110A-D to function properly, the pedestal 208, above, and the concave isolator base 202 below, allows some rotation as the pedestal and slider move relative to each other during a lateral force event.

In at least one embodiment, a lubricant such as a petroleum based grease or a metal based lubricant or a polymer type material or other suitable, reduced friction substance is placed between the concave lower surface 208A of the pedestal and the convex upper surface 206A of the slider. A perimeter curb 202B prevents the movable rolling bearings 204 and slider 206 from exceeding the diameter of the upper surface 202A of the base and destabilizing the supported structure 101. In at least one embodiment, the movable rolling bearings do not fill the entire upper surface of the base defined by the perimeter curb 202B so that the movable rolling bearings can roll and shift laterally across and around the upper surface 202A of the base, during a lateral force event. In at least one embodiment, the movable rolling bearings are substantially spherical, ball-shaped bearings. It should be understood that the movable rolling bearings can be in other shapes such as ellipsoid or other suitable, rolling shapes.

For testing purposes, a fully functional rolling pendulum base isolation system 100 was constructed using limited resources of materials, man hours and cost. The selected materials and methods were evaluated for strength, cost-efficiency and practical construction resources. In a test implementation, the rolling pendulum base isolation system 100 utilized concrete to form the shapes of the base 202, the slider 206, the pedestal 208 and the simulated structure 101. The base 202, the slider 206, the pedestal 208 were formed with normal to high-strength concrete. The base 202, slider 206 and pedestal 208 can be formed from any suitable materials such as metallic materials, ceramic materials, composite materials, plastics and combinations thereof and any suitable manufacturing process such as machining, cast, forging, stamping, additive manufacturing and combinations thereof.

16 gauge, steel sheets were utilized to form the curved upper (sliding) and lower (rolling) surfaces 202A, 206B, 206A and 208A. The steel sheets were formed into spherical dish shapes and attached securely to their respective concrete components via tabs cut out from the steel sheets. The steel sheets can include non-limiting examples of various thicknesses and alloys of steel, stainless steel, various coatings such as galvanized or anodized or a hardening coating. The steel sheets can also include various plastics, ceramics, other non-ferrous metals, polytetrafluorocthylene (PTFE) and similar materials and combinations and layers thereof.

Golf balls were used to simulate the rolling bearings 204, for testing purposes. Using the golf balls allows a larger vertical load to be applied without damaging the metal surfaces of the base 202 and the slider 206. As tested, the test isolators 110A-D limit the maximum vertical load to prevent scratching and indenting the steel plates of the curved upper (sliding) and lower (rolling) surfaces 202A, 206B, 206A and 208A. The dimples and elasticity of golf balls create a much larger bearing area than steel ball bearings, for testing purposes. In an actual construction of the rolling pendulum base isolation system 100, the bearings 204 would be formed from stronger, more durable materials than golf balls. The rolling bearings 204 can be formed from numerous materials and combinations thereof. Some non-limiting example bearing materials include steel, non-ferrous metals, ceramics, polymers, composites, plastics, etc., and combinations thereof. In at least one implementation, the rolling bearings 204 include a metallic ball with an outer cover covering at least a portion of the ball. The outer covering can be formed from a plastic material or polytetrafluoroethylene (PTFE) and similar materials. The outer surface can optionally include multiple concave dimples, similar to a golf ball, and/or multiple flat portions.

The radii R1 and R2 of the curved upper (sliding) and lower (rolling) surfaces 202A, 206B, 206A and 208A can be selected for the desired performance of the rolling pendulum base isolation system 100. Selected radius R1 is directly related to the period of the structure that the rolling pendulum base isolation system supports, where the structure period is the inverse of the frequency. The selection of the radius R1 also assists in self-centering after any lateral shifting caused be a lateral force event. In the implementation used for testing purposes, described herein, the radii R1 and R2 was 50.5 inches (128.3 cm) and 8.5 inches (21.6 cm). This 50.5 inch (128.3 cm) radius was selected so that the test structure 101 would self-center and not shift so far as to contact the rim structure 202B on the perimeter of the base 202.

The radius of the ball-shaped bearings 204, is selected to provide the number of bearings that fit into the upper surface 202A of the base 202, as each bearing will have a maximum load capacity and the total load is a function of the weight of the structure 101 being supported by the bearings and the number of isolators 110A-D. Additionally, the diameter of the bearings 204 can vary, with a larger diameter provides for more surface area on each dimple on the surface of the bearings. A larger diameter ball-shaped bearings 204 can support a larger diameter dimple and hence provide more bearing area. The diameter of the dimple can determine the actual bearing area. However, as the diameter of the dimple increases, the bearing will have more resistance to rolling, thus increasing the overall friction of the rolling pendulum base isolation system 100, which can increase the lateral forces transmitted to the structure being supported.

Figure 3:
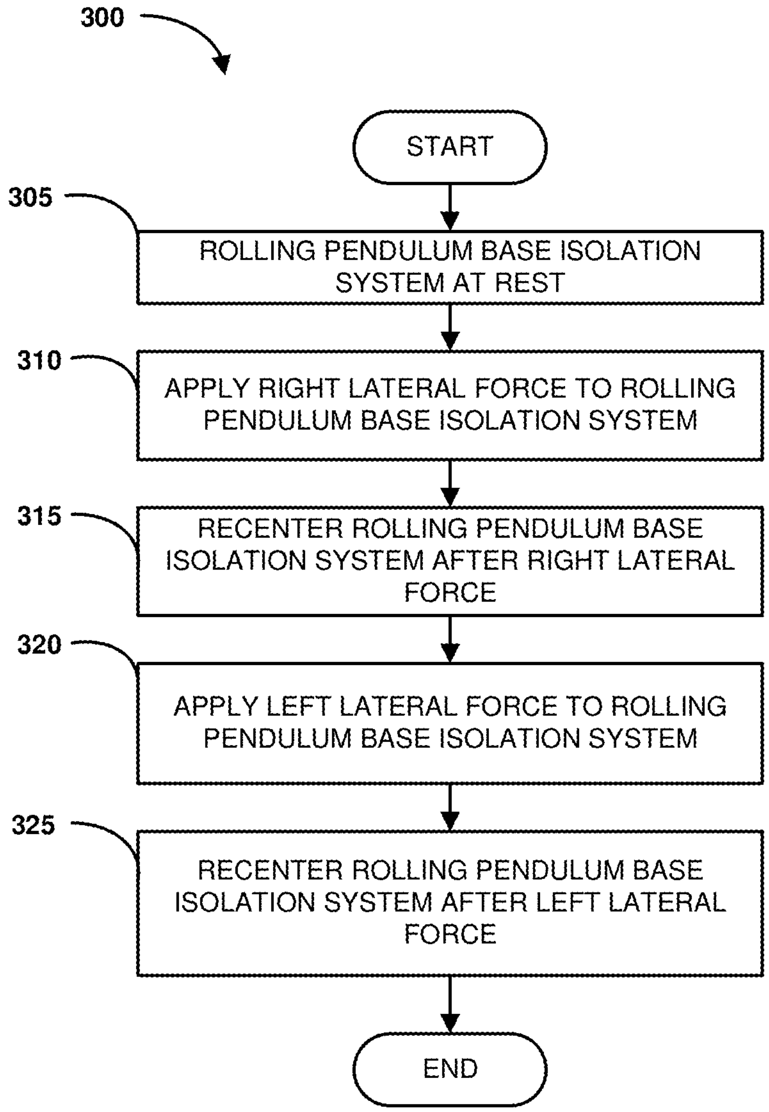
FIG. 3 is a flowchart diagram that illustrates the method operations performed in isolating a supported structure from lateral force events using the rolling pendulum base isolation system, for implementing embodiments of the present disclosure.
Figure 4:
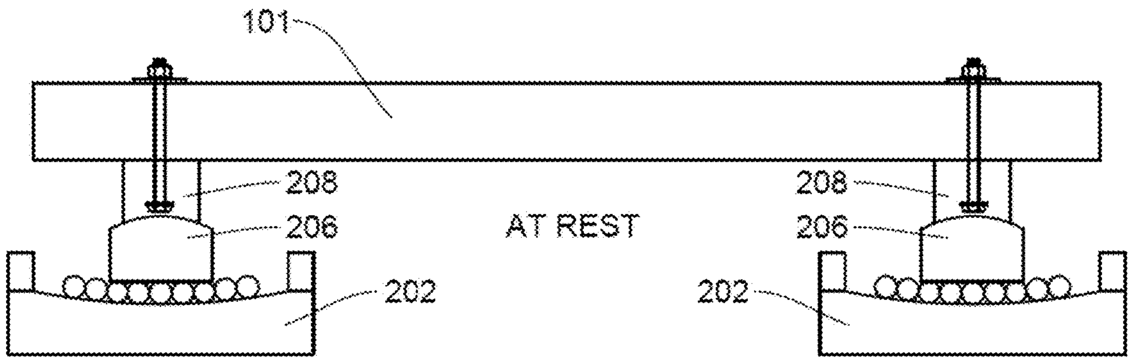
FIGS. 4-6 illustrate a schematic side view of the rolling pendulum base isolation system, in operation, for implementing embodiments of the present disclosure.
Figure 5:
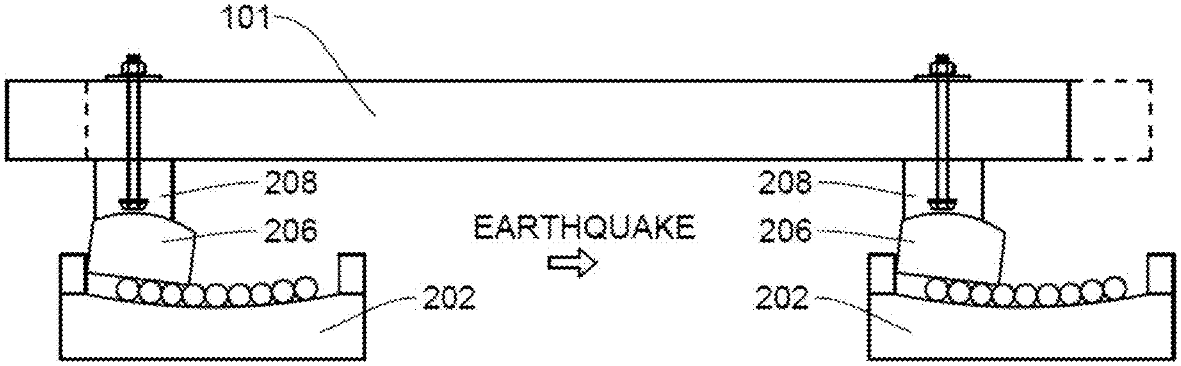
Figure 6:
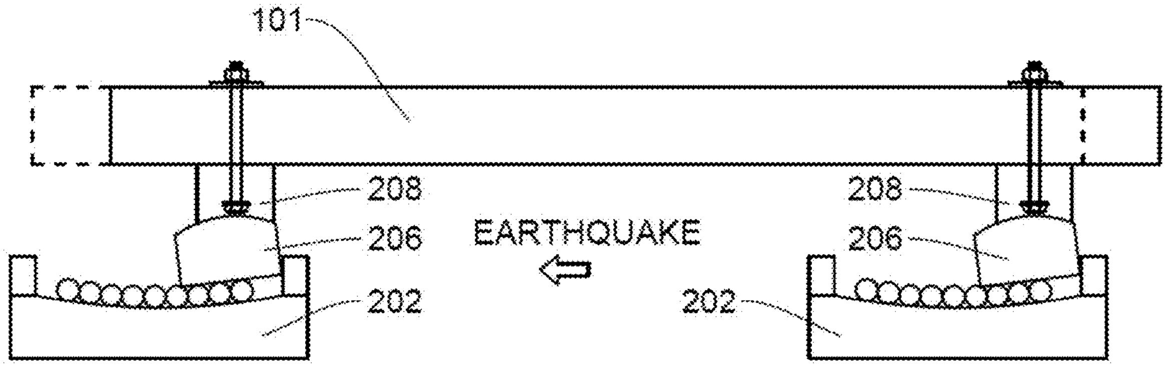

FIG. 3 is a flowchart diagram that illustrates the method operations 300 performed in isolating a supported structure from lateral force events using the rolling pendulum base isolation system 100, for implementing embodiments of the present disclosure. FIGS. 4-6 illustrates a schematic side view of the rolling pendulum base isolation system 100, in operation, for implementing embodiments of the present disclosure. In an operation 305, and as shown in FIG. 4, the rolling pendulum base isolation system is in a stable or at rest state. The pedestal 208, slider 206 and base 202 are substantially aligned and concentric with the bearings 204 between the slider and the base.

In an operation 310 and as shown in FIG. 5, the rolling pendulum base isolation system 100 operates during an earthquake inputting a lateral force to the right, as shown, to shift the base 202 to the right and allowing the structure 101, the pedestal and the slider to remain substantially stable position, thus separating the lateral movement of the base 202 from the structure 101. Relative to the base, the pedestal 208 shifts slightly to the left and pivots slightly in relation to the slider 206 and the slider shifts slightly to the left, on the bearings, away from the center of the base 202. In an operation 315, after the earthquake movements have ceased, the concave shape of the top surface 202A of the base causes the isolator system to substantially re-center, as shown above, in FIG. 4.

In an operation 320 and as shown in FIG. 6, the rolling pendulum base isolation system 100 operates during an earthquake inputting force to the left, as shown, to shift the base to the left and allowing the structure 101, the pedestal and the slider to remain substantially stable position, thus separating the earthquake movement from the structure. Relative to the base 202, the pedestal 208 shifts slightly to the right and pivots slightly in relation to the slider 206 and the slider shifts slightly to the right, on the bearings, away from the center of the base 202. In an operation 325, after the earthquake movements have ceased, the concave shape of the top surface 202A of the base causes the isolator system to substantially re-center, as shown above, in FIG. 4.

Figure 7:
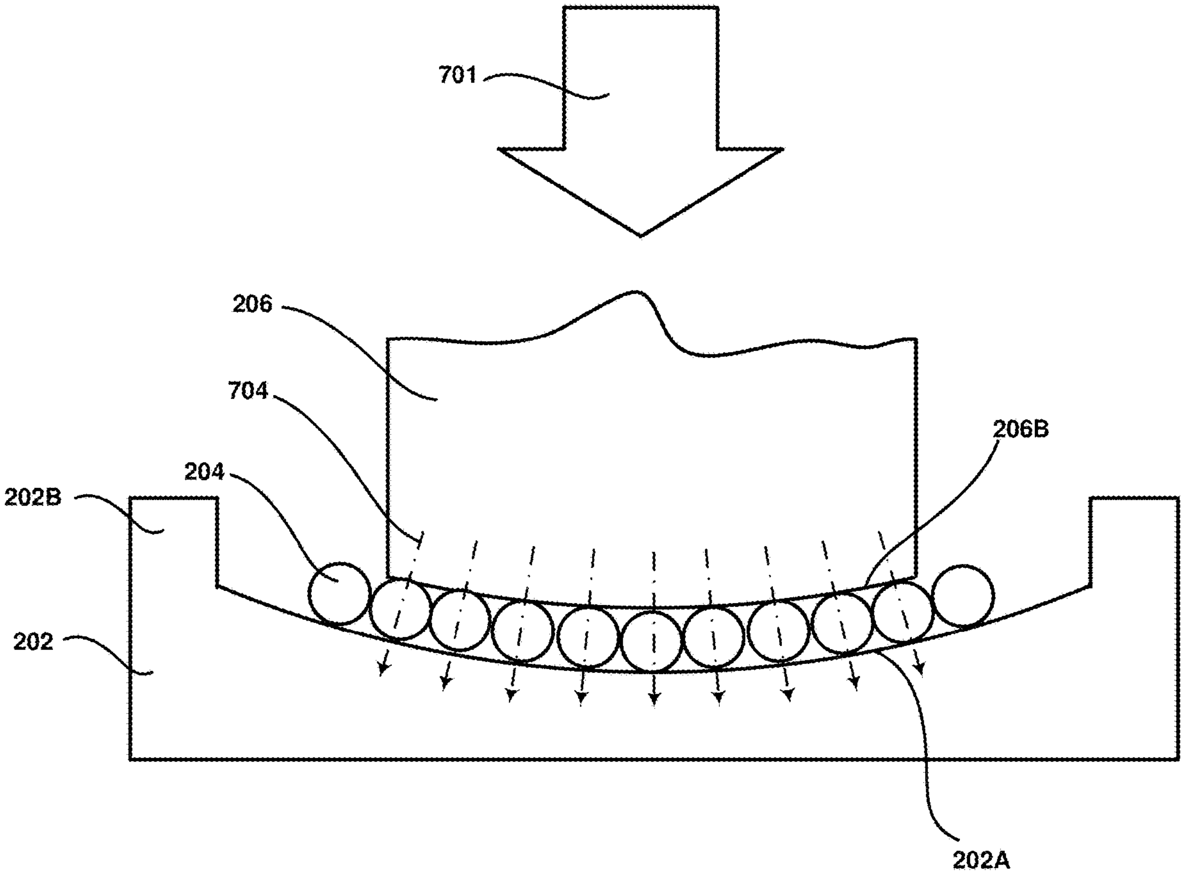
FIG. 7 is a schematic side view of the mass of the structure being supported by the rolling pendulum base isolation system, for implementing embodiments of the present disclosure.

FIG. 7 is a schematic side view of the mass 701 of the structure 101 being supported by the rolling pendulum base isolation system 100, for implementing embodiments of the present disclosure. The mass 701 of the structure 101, as illustrated by the multiple arrows, is transferred perpendicular to the spherical surface 206A of the slider 206, though the bearings 204 and into the spherical surface 202A of the base 202. FIGS. 8A-8D are schematic top views of the base 202, the bearings 204, the slider 206 and the pedestal 208, for implementing embodiments of the present disclosure.

The pedestal 208, slider 206 and base 202 components include curved upper (sliding) and lower (rolling) surfaces 202A, 206B, 206A and 208A that serve as interfaces for adjacent components. In at least on implementation, adjacent surfaces have substantially identical curvature for proper functionality. These convex and concave components are typically milled out of solid metal (steel) using high-precision industrial machinery such as vertical turning lathes. A different process was utilized to create similar functioning components for the described rolling pendulum base isolation system 100.

Figure 8A:
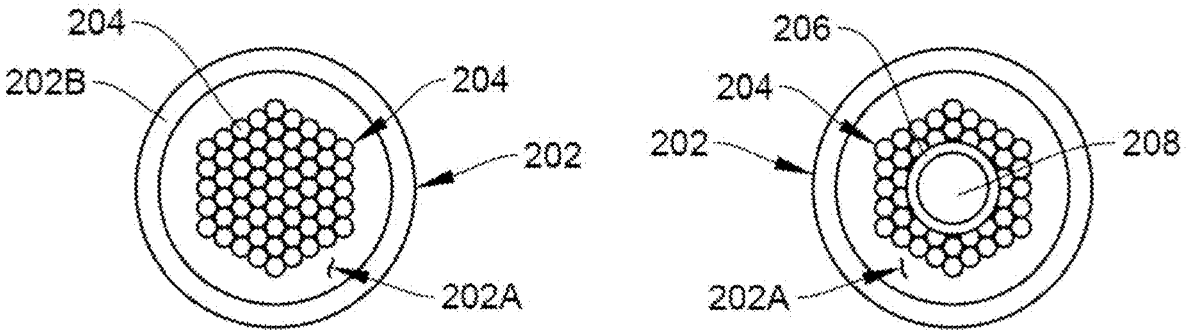
FIGS. 8A-8D are schematic top views of the base, the bearings, the slider and the pedestal, for implementing embodiments of the present disclosure.
Figure 8B:
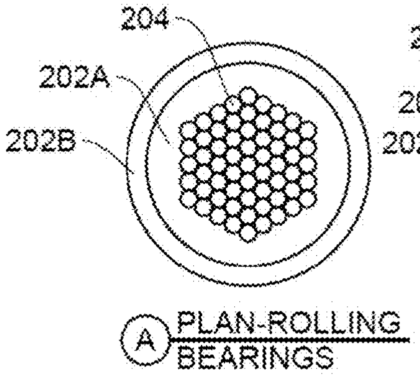
Figure 8C:
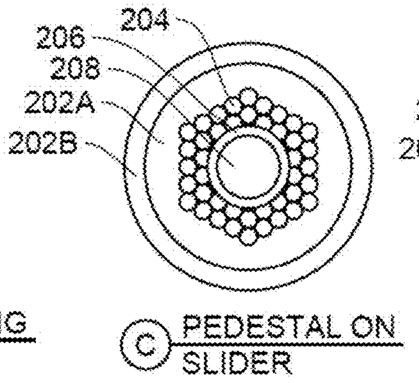
Figure 8D:
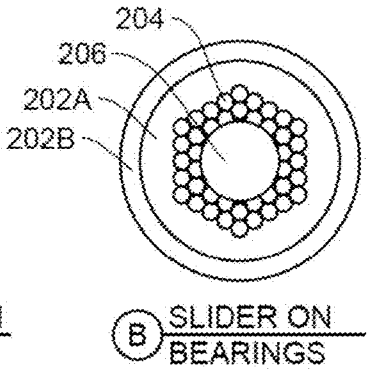
Figure 8E:
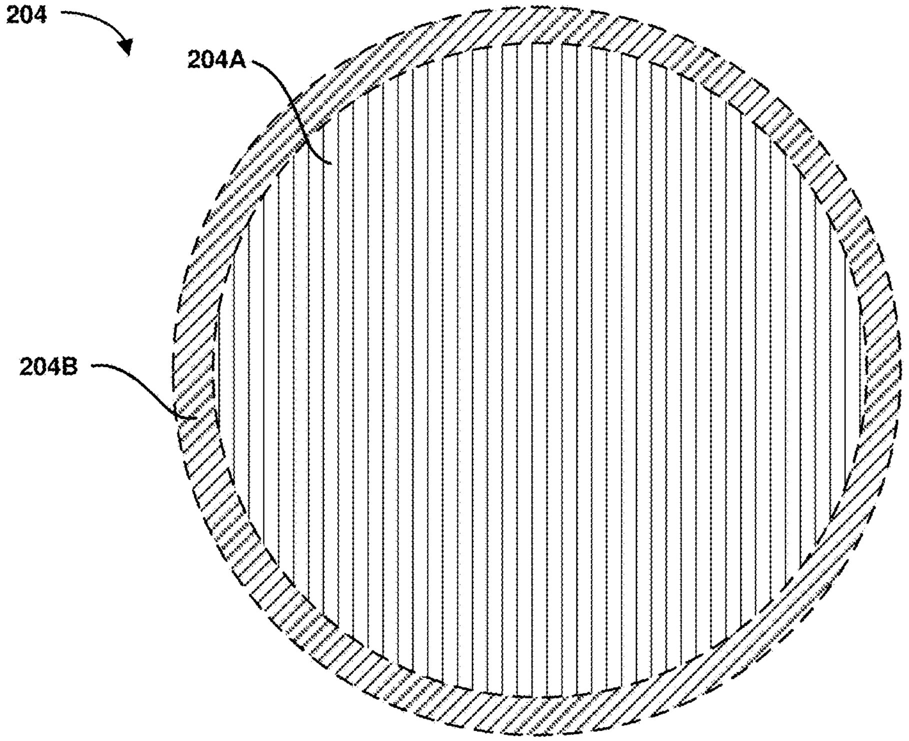
FIG. 8E is a sectional view of one of the multiple bearings, for implementing embodiments of the present invention.

FIG. 8E is a sectional view of one of the multiple bearings 204, for implementing embodiments of the present invention. In at least one implementation the bearing 204 can be spherical. The diameter of the bearing can vary for the implementation. By way of example, as the diameter of the pedestal 208, slider 206 and base 202, increases, the diameter the bearings 204 can increase or alternatively remain constant and the number of the bearings can increase.

In an alternative implementation the bearing can include two or more layers 204A and 204B. In at least one implementation, the inner layer 204A and the outer layer 204B can be formed of different materials. In at least one implementation, the inner layer 204A has a greater density than the outer layer 204B. Alternatively, the outer layer 204B has a greater density than the inner layer 204A. Further, the thickness of the layers 204A, 204B can vary with the desired application. By way of example, in the test implementation described herein, the diameter of the bearing is about 1.70 inches (43.2 mm) with the outer layer 204B having a thickness of about 0.10 inches (2.5 mm).

Figure 8F:
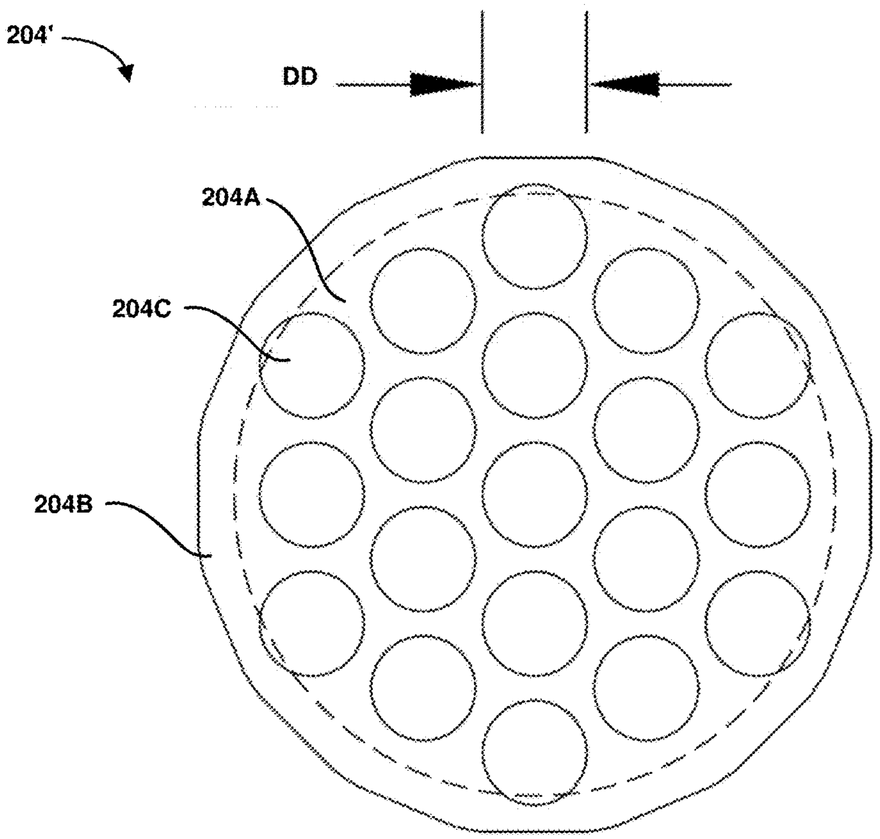
FIG. 8F is a side view of an alternative implementation of one of the multiple bearings, for implementing embodiments of the present invention.

FIG. 8F is a side view of an alternative implementation of one of the multiple bearings 204', for implementing embodiments of the present invention. The surface of the bearing 204' can include multiple circular portions 204C. The multiple circular portions 204C may be flat portions or alternatively dimpled portions or combinations thereof. The multiple circular portions 204C can aid in the rotation of the bearings 204' when the rolling pendulum base isolation system 100 has been in a static position for extended periods of time, thus aiding in reducing the resistance of the rolling pendulum base isolation system to lateral movements when a lateral force is applied to the system.

The multiple circular portions 204C can be substantially evenly distributed about the surface of the bearing 204'. The multiple circular portions can have nominally equal or varying diameters DD. In at least one implementation, the multiple circular portions have a diameter DD between about 5 percent and about 20 percent of the diameter of the bearing 204'. In an exemplary implementation, the bearing 204' has a diameter of about 1.70 inches (43.2 mm) and the multiple circular portions 204C have a diameter equal to about 0.26 inches (6.6 mm).

In at least one implementation, hydroforming can be used to form metal sheets into the curved upper (sliding) and lower (rolling) surfaces 202A, 206B, 206A and 208A. Hydroforming the metal sheets utilized high pressure water or other suitable fluid to form sheet metal to a selected substantially spherical curvature. The formed metal sheets are then cast into concrete to create the desired curved upper and lower surfaces of the base 202, the slider 206, the pedestal 208. In another implementation, the formed metal sheets can be formed by a stamping process.

Figure 9:
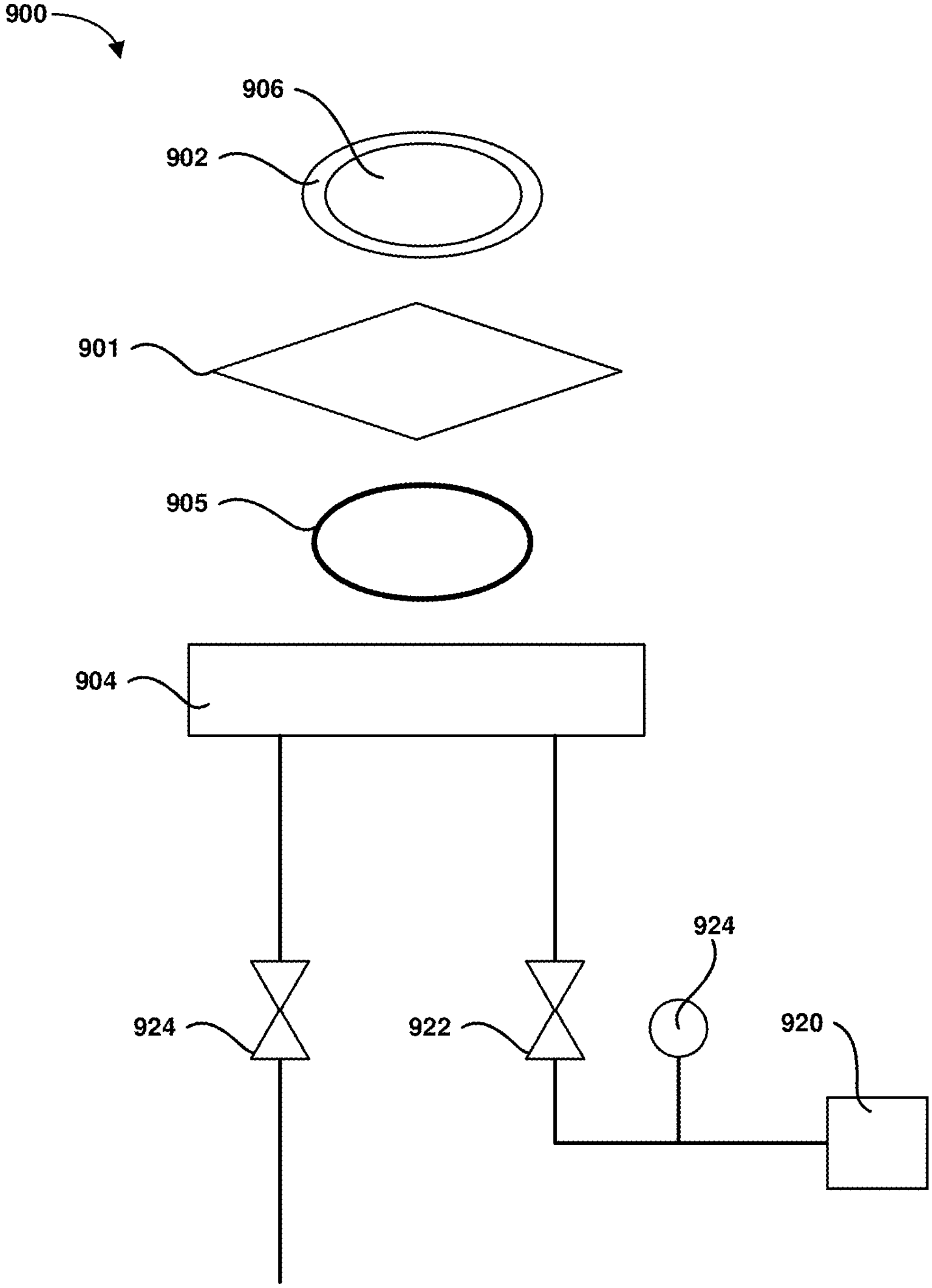
FIG. 9 illustrates a schematic view of an exemplary hydroforming system, for implementing embodiments of the present disclosure.
Figure 10:
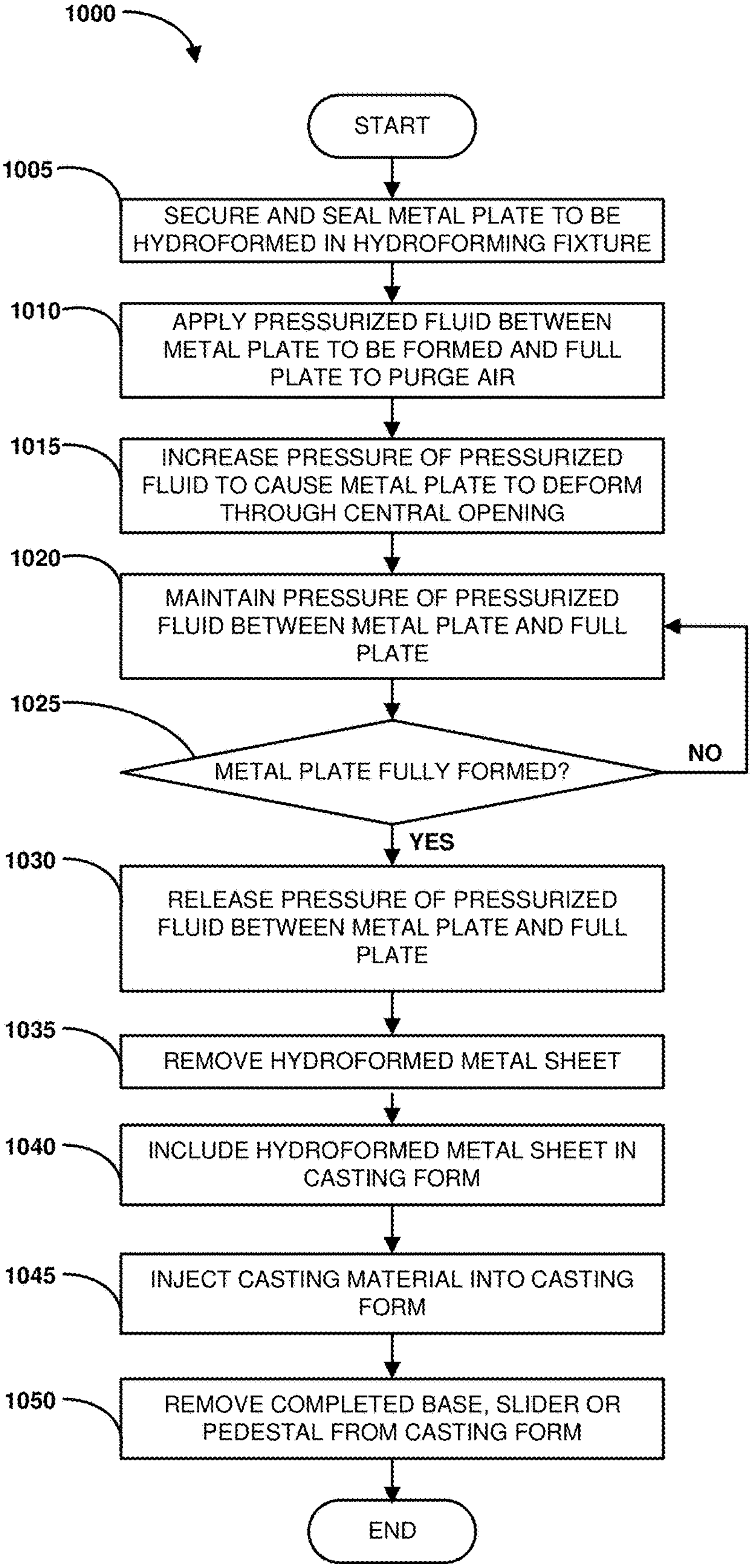
FIG. 10 is a flowchart diagram that illustrates the method operations performed in hydroforming the metal sheet and forming the curved upper (sliding) and lower (rolling) surfaces of the base, the slider, the pedestal, for implementing embodiments of the present disclosure.

FIG. 9 illustrates a schematic view of an exemplary hydroforming system 900, for implementing embodiments of the present disclosure. FIG. 10 is a flowchart diagram that illustrates the method operations 1000 performed in hydroforming the metal sheet and forming the curved upper (sliding) and lower (rolling) surfaces 202A, 206B, 206A and 208A of the base 202, the slider 206, the pedestal 208, for implementing embodiments of the present disclosure. The hydroforming system 900 provides an efficient hydroforming process producing repeatable, quality hydroformed metal sheets.

In an operation 1005, the metal sheet 901 to be hydroformed is secured between a forming plate 902 and a full plate 904. A pressure seal 905 is provided between the metal sheet 901 and the full plate 904. The forming plate 902 includes a central opening 906. To form a substantially spherical hydroformed sheet, the central opening is circular. The forming plate 902, metal sheet 901, pressure seal 905 and the full plate 904 can be secured in any suitable method such as bolts, clamps or combinations thereof.

In an operation 1010, a pressurized fluid is provided to the space between the full plate 904 and the metal sheet 901 to remove any air trapped between the full plate and the metal sheet. By way of example, a release valve 924 can be opened and a supply valve 922 can be opened to deliver pressurized fluid from the pressurized fluid source 920. A monitoring gauge 924 can monitor the pressure of the pressurized fluid. The pressurized fluid can be any suitable fluid such as water, oil or other no compressible fluid. The pressurized fluid source 920 can include any suitable pump or other method for pressurizing the pressurized fluid. The pressurized fluid flows through the space between the metal plate and the full plate and out the release valve and substantially purges any air between the metal plate and the full plate. Purging the air between the metal plate and the full plate may require a few second or more.

In an operation 1015, the release valve 924 is closed and the pressure of the pressurized fluid is increased sufficient to cause the metal sheet to deform through the central opening 906.

In operations 1020 and 1025, the pressure of the pressurized fluid between the metal sheet and the full plate are maintained until the sheet metal is deformed to the desired height, then the method operations continue in an operation 1030.

Figure 11:
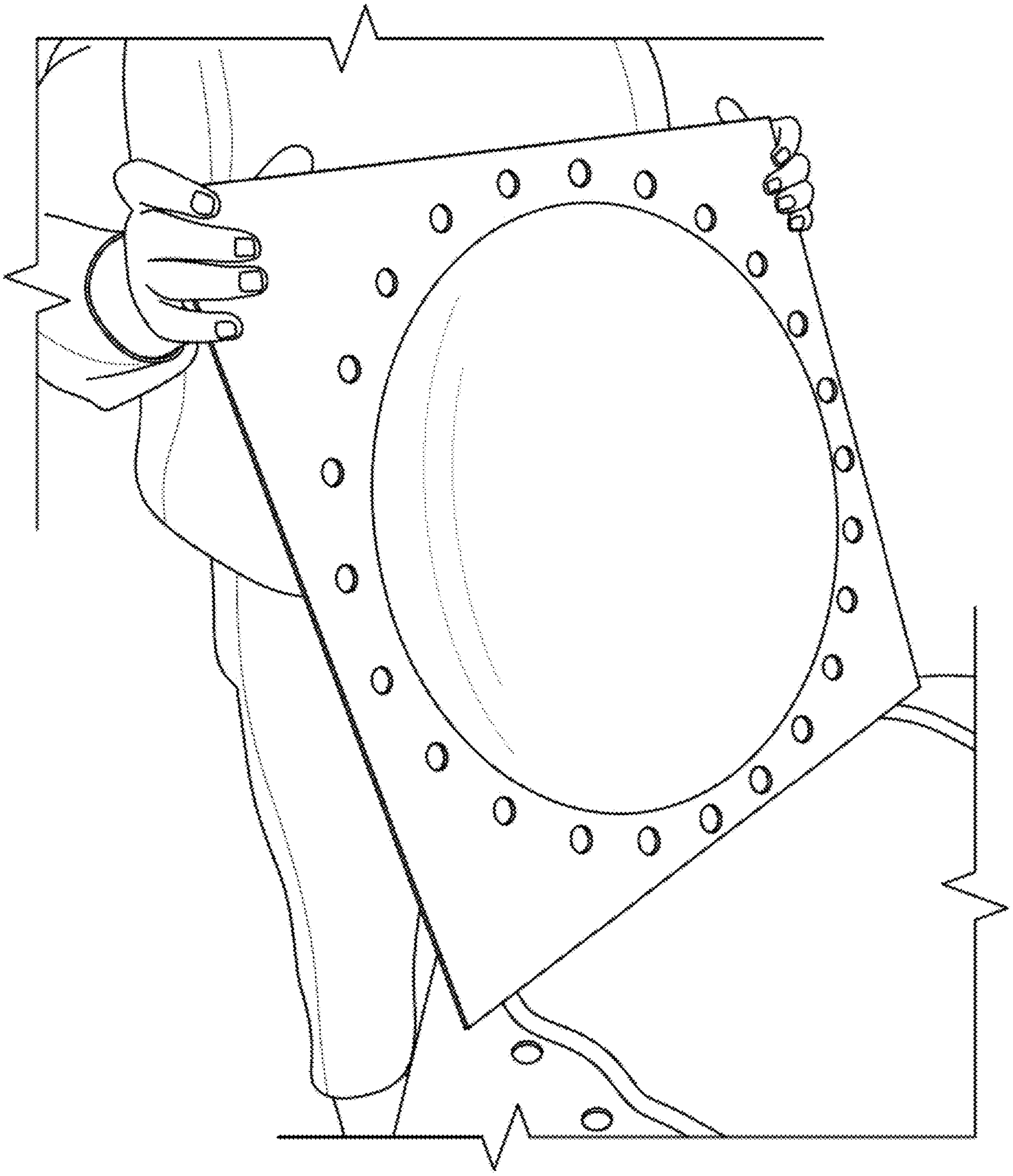
FIG. 11 illustrates an exemplary hydroformed metal sheet, for implementing embodiments of the present disclosure.

In operation 1030, the supply valve 922 is closed and the release valve 924 are opened to release the pressure of the pressurized fluid between the now hydroformed metal sheet and the full plate. In an operation 1035 the hydroformed metal sheet is removed from the hydroforming system 900. FIG. 11 illustrates an exemplary hydroformed metal sheet, for implementing embodiments of the present disclosure.

Figure 12:
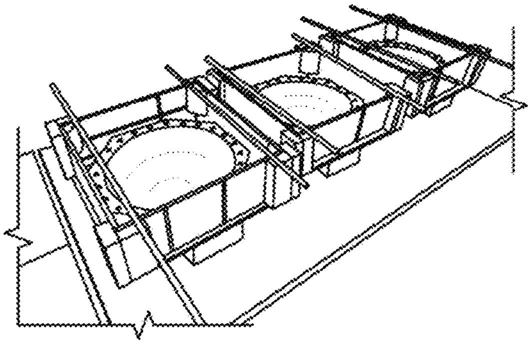
FIGS. 12 and 14 illustrate exemplary 3-dimensional casting form for the respective base, slider, or pedestal, for implementing embodiments of the present disclosure.
Figure 14:
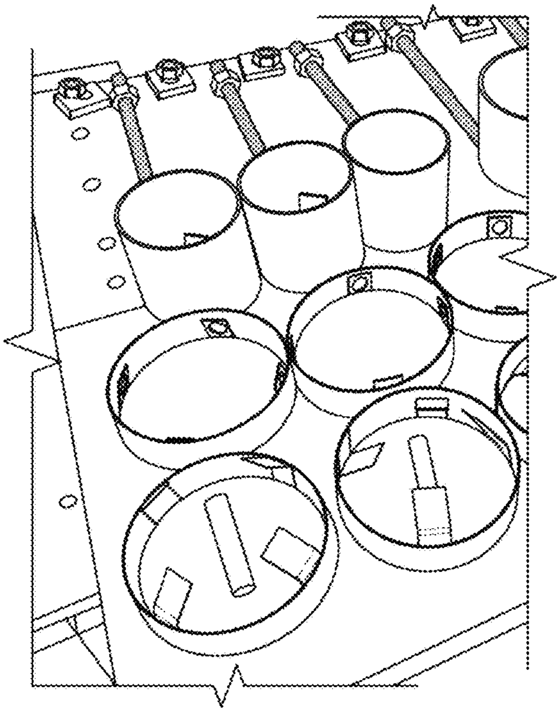

In an operation 1040, one or more the hydroformed sheet(s) is included in a 3-dimensional casting form for the respective base 202, slider 206, or pedestal 208. FIGS. 12 and 14 illustrate exemplary 3-dimensional casting form for the respective base 202, slider 206, or pedestal 208, for implementing embodiments of the present disclosure.

Figure 13:
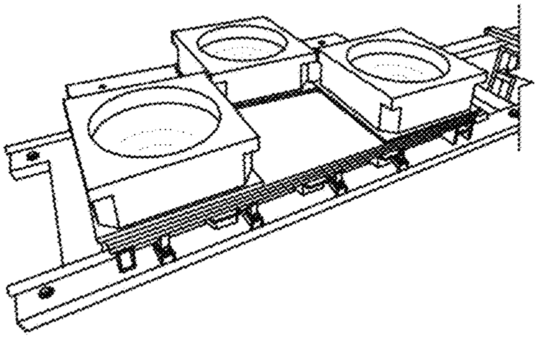
FIGS. 13 and 15 illustrate exemplary base, slider, or pedestal, as removed from the respective casting forms, for implementing embodiments of the present disclosure.
Figure 15:
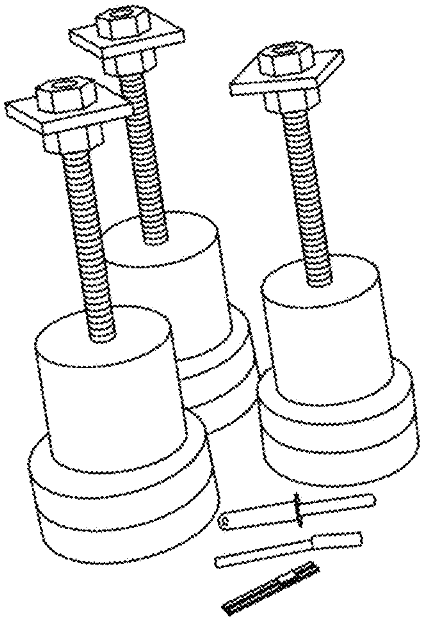

In an operation 1045, a suitable casting material is injected into the 3-dimensional casting form for the respective base, slider, or pedestal. The suitable casting material can include concrete, composite material or any other material sufficiently strong enough to support the structure being supported 101, and combinations thereof. The casting material can also include reinforcing materials such as fibers, reinforcing rods, such as commonly referred to as rebar in metal and composite forms, and other suitable reinforcing materials, and combinations thereof. In an operation 1050, the cast base, slider, or pedestal is removed from the 3-dimensional casting form and the method operations can end. FIGS. 13 and 15 illustrate exemplary base 202, slider 206, or pedestal 208, as removed from the respective casting forms, for implementing embodiments of the present disclosure.

In at least one implementation, the hydroformed metal sheet can be cut into specialized shapes to be cast into concrete. For the base 202, this can also include forming chamfer corner cuts to allow for concrete consolidation. One #3 rebar hoop was bent and used to reinforce the curb 202B, and multiple #3 horizontal rebars extending laterally in multiple directions, were cast into the concrete of the base body, underneath the upper surface 202A, for additional tensile capacity for a safer and more ductile potential failure. High-strength concrete mix (5000 psi) can be used as the casting material, in at least one implementation.

The 3-dimensional casting forms for the slider and the pedestal can be formed with cardboard or plastic tubes or similar suitable forms for 8-inch dia. (for one implementation) sliders and for 6-inch dia. (for one implementation) pedestals, capped with hydroformed steel sheets. The surface of the hydroformed steel sheets can be secured or bonded to the casting material via excess sheet steel bent into form "tabs" that extend into the casting material, before casting, as shown in FIG. 14. The surface of the hydroformed steel sheets can be secured or bonded to the casting material using chemical bonding agent such as an adhesive.

The sliders can be cast in two portions, to allow the top convex surface to fully fill with casting material, in a first portion. The first portion can include one or more reinforcing rod(s). After the first portion is cured, the first portion is inverted and placed on top of a newly poured second portion. For the pedestals, a long, threaded rod designed to connect to the supported structure, above the isolators, is set into the casting form during the casting process. In at least one implementation, Quik-Crete™ (4000 psi) can be used as the casting material for the slider and pedestal.

Figure 16:
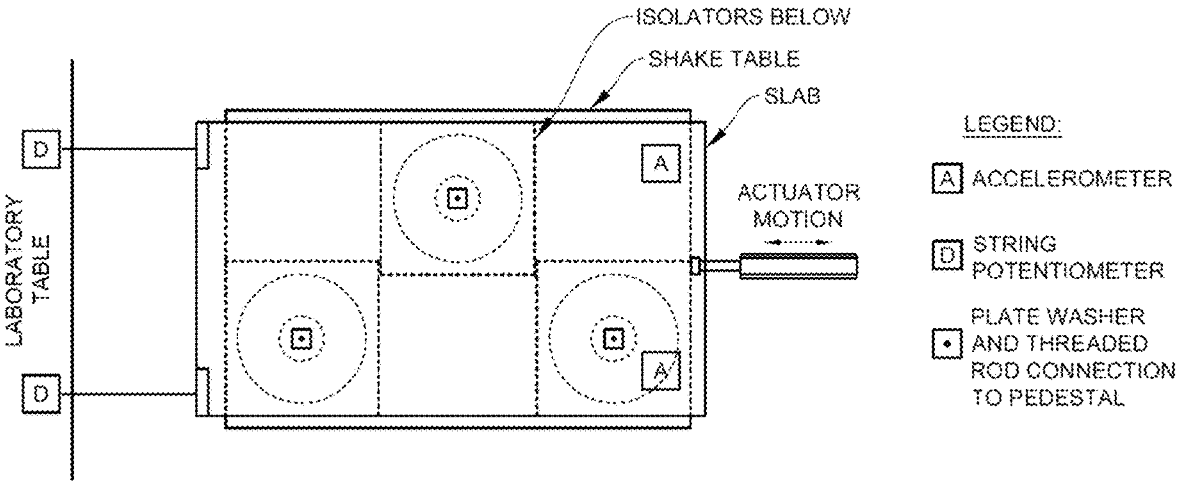
FIG. 16 is a schematic view of test fixture for testing a rolling pendulum base system, for implementing embodiments of the present disclosure.

A scaled implementation of the rolling pendulum base system 100 was tested using a 4-foot by 6-foot uniaxial shake table. FIG. 16 is a schematic view of test fixture for testing a rolling pendulum base system 100, for implementing embodiments of the present disclosure. A 1500 pound (680 kg) concrete slab is securely fastened to the isolator pedestals to simulate a structure supported by the rolling pendulum base system. The isolator bases are secured to a plywood shake table surface. The base isolator layout on the shake table is based on space requirements and stability considerations. Although the isolator configuration was not symmetric about the longitudinal axis (forcing direction), small amounts of torsional motion were considered to have negligible effects on the results due to uniaxial forcing motion and a redundant instrumentation layout.

Acceleration and displacement data was collected from instruments mounted to the shake table and the slab. This setup enabled a comparison of the "ground" plane motion to the isolated plane motion, which provides essential data on the effectiveness of the rolling pendulum base system. A total of three displacement measuring devices were used. Two string displacement potentiometers were mounted to a separate laboratory table two feet away from the base isolated slab. The string ends were magnetically hooked onto a steel angle attached to the slab via screw clamps. One displacement measuring device was built into the shake table mechanism.

Three acceleration measuring devices were used. Two dual-axis accelerometers were manually attached to the concrete slab, and one accelerometer was built into the shake table mechanism. Output voltages from all instruments were read, scaled, filtered, and recorded using the computer application NI Signal Express 2015. Results were exported to Excel for tabulation and analysis.

Figure 17:
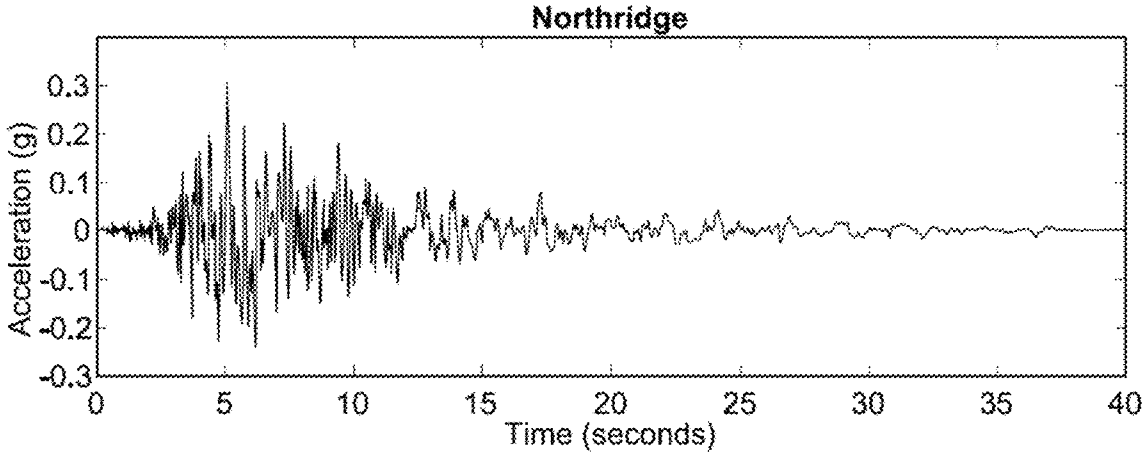
FIG. 17 is a graphical representation of the input time history for the 1994 Northridge earthquake, as a time base reference, for implementing embodiments of the present disclosure.

The rolling pendulum base system was tested with a comprehensive array of harmonic motions as well as earthquake time histories. To induce harmonic motions of specified frequencies and amplitudes, a frequency generator was used as the input for the shake table control module. The harmonic motion testing range included frequencies of 1-4 hertz and amplitudes of 1-10 volts, each in one-unit increments. Once a frequency value was set, the full range of amplitudes was cycled through until negligible change in forcing motion occurred with increasing increments due to the limitations of the shake table actuator. This protocol was followed for each of the four frequency values, resulting in a total of 34 data sets. Data was collected over a 5 second period when the slab motion became visibly regular after each amplitude increase. For the seismic time history motions, the computer application DAQView on a personal computer was used as the input for the shake table control module. Each time history data file contained approximately 30-40 seconds of motion. A variety of time histories was available to use in the laboratory database, including 7 historic records of earthquakes and three custom motions created for the testing of Earthquake Engineering Research Institute (EERI) student competition models. Data was recorded for the entirety of each motion. FIG. 17 is a graphical representation of the input time history for the 1994 Northridge earthquake, as a time base reference, for implementing embodiments of the present disclosure.

Figure 18:
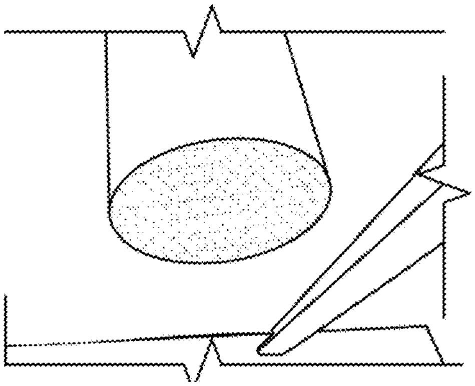
FIGS. 18 and 19 illustrate the slider and bearings during testing, for implementing embodiments of the present disclosure.
Figure 19:
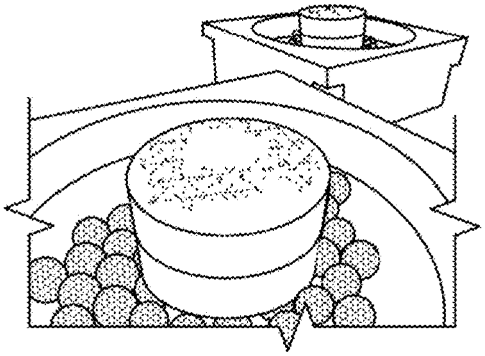

FIGS. 18 and 19 illustrate the slider and bearings during testing, for implementing embodiments of the present disclosure. Through all the harmonic motion testing and earthquake testing, the pedestals remained fully on the sliders, and the sliders themselves never displaced far enough to hit the perimeter curb of the isolator bases. The golf balls used as bearings in the isolator bases lost some definition on the individual dimples, but the overall dimensions of the golf balls did not change due to a lack of permanent deformation and therefore were not replaced throughout all testing. Additionally, the golf balls did not scratch or indent the steel surfaces of the isolator pieces.

Figure 20A:
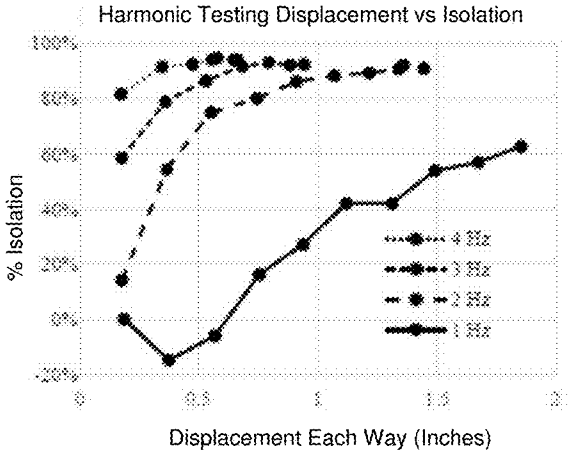
FIGS. 20A-20B are graphical representations of isolation and damping percentages plotted as a function of the shake table displacement, for implementing embodiments of the present disclosure.
Figure 20B:
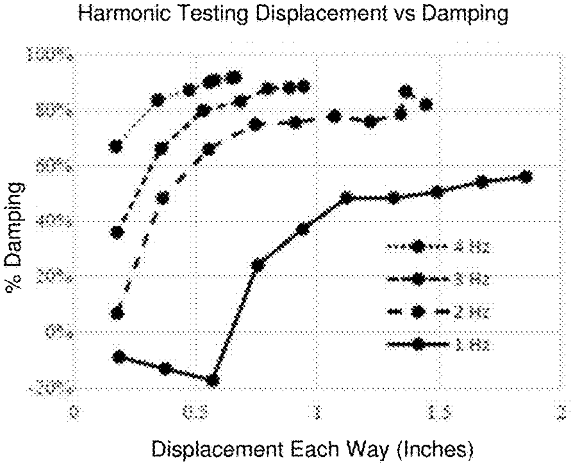
Figure 21A:
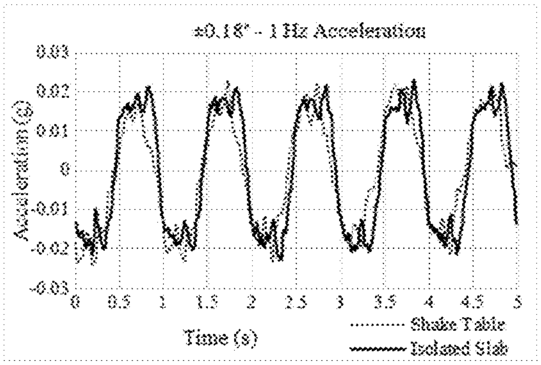
FIGS. 21A-21B are graphical representations of acceleration and displacement data of the slab, as compared to the acceleration and displacement data of the shake table, for implementing embodiments of the present disclosure.
Figure 21B:
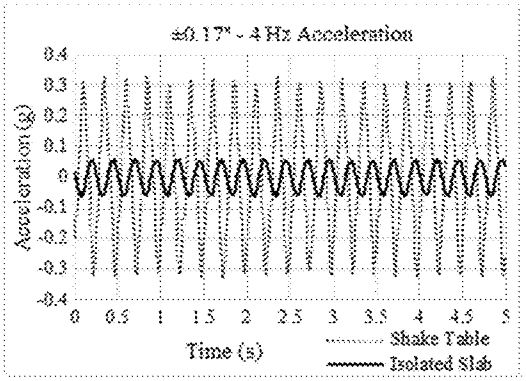
Figure 22A:
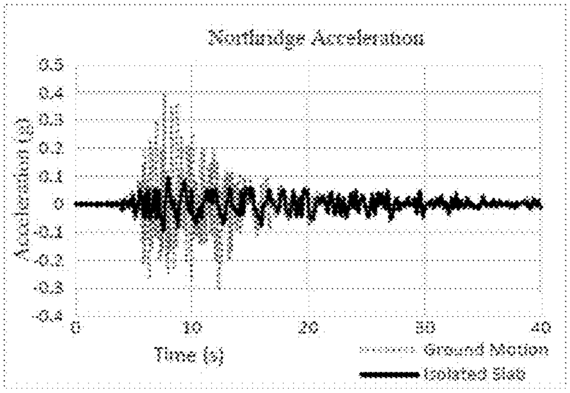
FIGS. 22A-22D are graphical representations of four exemplary reference earthquake data, for implementing embodiments of the present disclosure.
Figure 22B:
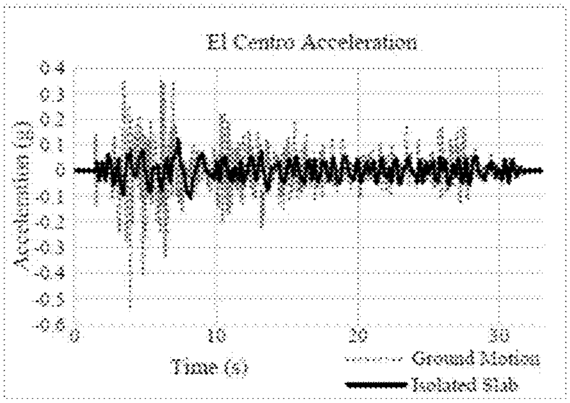
Figure 22C:
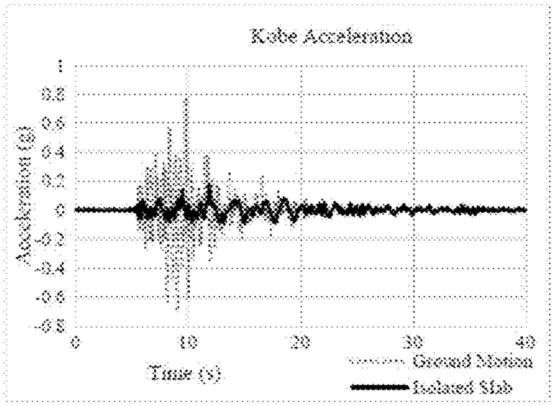
Figure 22D:
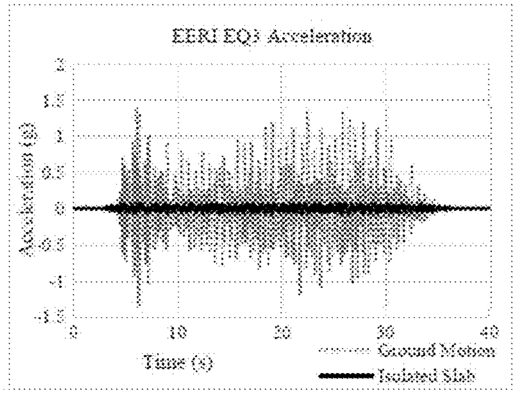

FIGS. 20A-20B are graphical representations of isolation and damping percentages plotted as a function of the shake table displacement, with each line representing a different frequency of the harmonic motion of the shake table, for implementing embodiments of the present disclosure. FIG. 20A illustrates the percent isolation versus the varying displacements for the four frequencies tested, whereas FIG. 20B illustrates the percent damping versus the varied displacements for the same frequencies. FIGS. 21A and 21B show the acceleration of the slab and the shake table for the smallest harmonic testing displacement, or 1 volt, for the lowest and highest frequency, or 1 hertz and 4 hertz, respectively, for implementing embodiments of the present disclosure. The comparison of the relative acceleration and displacement data of the slab to the shake table approximates an effective isolation and damping percentage of each specific harmonic motion test. Earthquake testing was completed successfully for ten different ground motions. FIGS. 22A-22D are graphical representations of four exemplary reference earthquake data, for implementing embodiments of the present disclosure. For further context:

$$\text{Reduced Acceleration or Displacement} = \left(1 - \frac{\text{Isolated Slab Acceleration or Displacement}}{\text{Shake Table Acceleration or Displacement}}\right) \times 100\%$$

Note that for the lowest frequency, the slab moves in phase with the shake table, therefore not isolating and in some cases resulting in the slab having higher accelerations and displacements than the shake table, hence the negative effective percentages of isolation and damping. Also note that for the highest frequency, the acceleration of the slab is much smaller than the shake table, resulting in an effective 81.8% effective isolation, which is shown as the first data point on the left graph of FIGS. 20A-20B.

From these various tests and analysis, it can be observed that the prototype isolation system performs best when the ground is shaking at more vigorous accelerations, or higher frequencies. For both the harmonic testing and the earthquake testing, this observation remains consistent. There are still large isolation benefits at lower accelerations that will help lower the lateral forces applied to a structure even during lower magnitude earthquakes. The relationship between the magnitude of the accelerations and the isolator effectiveness is not linear, as they are diminishing returns resulting in an asymptotic behavior of the summary graphs in FIGS. 20A-20B.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the disclosure is not to be limited to the details given herein but may be modified within the scope and equivalents of the appended claims.

What is claimed is:

1. A rolling pendulum base system comprising:

a base including a concave upper base surface;

a first plurality of bearings supported within the concave upper base surface;

a slider including a slider body, a convex upper slider surface on an upper end of the slider body and a convex lower slider surface on a lower end of the slider body, the convex lower slider surface disposed on the first plurality of bearings, wherein the slider body is formed from a first quantity of cast material and the convex upper slider surface is formed from a first curved metal sheet and the convex lower slider surface is formed from a second curved metal sheet and the first curved metal sheet and the second curved metal sheet are bonded to the first quantity of cast material; and a pedestal including a pedestal body, a concave lower pedestal surface on a lower end of the pedestal body and a flat upper pedestal surface on an upper end of the pedestal body, the concave lower pedestal surface disposed on the convex upper slider surface.

2. The system of claim 1, wherein the pedestal body is formed from a second quantity of cast material and the concave lower pedestal surface is formed from a third curved metal sheet bonded to the second quantity of cast material.

3. The system of claim 1, wherein the concave upper base surface is formed from a fourth curved metal sheet.

4. The system of claim 1, wherein the concave upper base surface and the convex lower slider surface have a first radius R1 and the convex upper slider surface and the concave lower pedestal surface have a second radius R2.

5. The system of claim 4, wherein the first radius R1 is different than the second radius R2.

6. The system of claim 1, wherein the base includes a perimeter curb disposed on a perimeter of the upper base surface.

7. The system of claim 1, wherein the concave upper base surface has a circular shape having a first diameter.

8. The system of claim 7, wherein the convex lower slider surface has a circular shape having a second diameter, wherein the first diameter is greater than the second diameter.

9. The system of claim 1, wherein the concave lower pedestal surface has a circular shape having a third diameter and wherein the convex upper slider surface has a circular shape having a fourth diameter.

10. The system of claim 9, wherein the third diameter is equal to or greater than the fourth diameter.

11. The system of claim 9, wherein the fourth diameter is equal to or greater than the third diameter.

12. The system of claim 1, wherein each one of the first plurality of bearings includes a plurality of dimples on a respective surface of each one of the first plurality of bearings.

13. A rolling pendulum base system comprising:
- a base including a concave upper base surface, the concave upper base surface including a first hydroformed metal sheet bonded to a base body;
- a first plurality of bearings supported within the concave upper base surface;
- a slider including a slider body, a convex upper slider surface on an upper end of the slider body and a convex lower slider surface on a lower end of the slider body, the convex lower slider surface disposed on the first plurality of bearings, convex upper slider surface including a second hydroformed metal sheet bonded to the upper end of the slider body and the convex lower slider surface including a third hydroformed metal sheet bonded to the lower end of the slider body; and
- a pedestal including a pedestal body, a concave lower pedestal surface on a lower end of the pedestal body and a flat upper pedestal surface on an upper end of the pedestal body, the concave lower pedestal surface disposed on the convex upper slider surface, wherein the concave lower pedestal surface includes a fourth hydroformed metal sheet bonded to the lower end of the pedestal.

14. A method of isolating a structure from a lateral force event comprising:
- supporting the structure on a rolling pendulum base isolation system;
- allowing the structure to roll on the rolling pendulum base isolation system in a first lateral direction in response to a lateral force imparted to the structure; and
- centering the structure on the rolling pendulum base isolation system after the lateral force, wherein the rolling pendulum base system includes:
- a base including a concave upper base surface;
- a first plurality of bearings supported within the concave upper base surface;
- a slider including a slider body, a convex upper slider surface on an upper end of the slider body and a convex lower slider surface on a lower end of the slider body, the convex lower slider surface disposed on the first plurality of bearings, wherein the slider body is formed from a first quantity of cast material and the convex upper slider surface is formed from a first curved metal sheet and the convex lower slider surface is formed from a second curved metal sheet and the first curved metal sheet and the second curved metal sheet are bonded to the first quantity of cast material; and
- a pedestal including a pedestal body, a concave lower pedestal surface on a lower end of the pedestal body and a flat upper pedestal surface on an upper end of the pedestal body, the concave lower pedestal surface disposed on the convex upper slider surface.

15. The method of claim 14, wherein each one of the first plurality of bearings includes a plurality of dimples on a respective surface of each one of the first plurality of bearings.

* * * * *